Patented Mar. 30, 1954

2,673,826

UNITED STATES PATENT OFFICE 2,673,826

LAMINATED STRUCTURES AND METHOD OF MAKING SAME

Arthur Bernard Ness, Landenberg, Pa., assignor to E. I. du Pont de Nemours and Company, Wilmington, Del., a corporation of Delaware No Drawing. Application February 27, 1952, Serial No. 273,783

18 Claims. (Cl. 154—139)

This invention relates to laminated structures and more particularly to such structures comprising laminae of a polyester and a blend of a resin and synthetic rubber.

U. S. Patent 2,465,319 describes a process for the preparation of linear highly polymerized esters of terephthalic acid and glycols of the series $HO(CH_2)_nOH$, where $n$ is a whole number within the range of 2 to 10. These polymeric esters may be spun into filaments and then woven into textile fabrics. They may be cast from organic solution to prepare unsupported films. A hot plastic mass of the linear polymeric terephthalate esters may be formed into unsupported films by passing the mass between smooth hot calender rolls or melt casting from a hopper.

For certain applications it is desirable to laminate the film or fabric prepared from the polyester described in U. S. 2,465,319 in a variety of constructions, such as, e. g. film to film, fabric to fabric, fabric to film, film or fabric to chemically dissimilar surfaces.

Throughout the specification and appended claims the term "linear polymeric terephthalate ester" refers to a linear highly polymerized ester of terephthalic acid and a glycol of the series $HO(CH_2)_nOH$, where $n$ is a whole number within the range of 2 to 10.

It is an object of this invention to provide laminated structures involving at least one lamina of a linear polymeric terephthalate ester. Another object is the provision of a process for uniting a linear polymeric terephthalate ester lamina to itself or other surfaces by means of an adhesive composition.

The objects of this invention are accomplished in accordance with this invention by laminating a layer of a linear polymeric terephthalate ester to itself or chemically dissimilar surfaces by means of a composition comprising as essential ingredients a copolymer of butadiene and acrylonitrile and a thermosetting heat reactive resin such as phenolaldehyde resin.

The linear polymeric terephthalate ester referred to in the following specific examples may be prepared in accordance with the teaching set forth in U. S. Patent 2,465,319 issued March 22, 1949 to Whinfield et al.

The following specific examples are given by the way of illustration and not limitation.

Example I

An unsupported film was prepared by mixing the following ingredients on a two-roll rubber mill in a manner well known in the rubber compounding art:

| | Parts |
|---|---|
| "Hycar" OR–15 (copolymer of butadiene and acrylonitrile) | 100.0 |
| Stearic acid | 1.5 |
| Carbon black | 54.0 |
| Sebacic diester of monobutyl ether of ethylene glycol | 15.0 |
| Zinc oxide | 5.0 |
| Benzothiazyl disulfide | 1.0 |
| Sulfur | 1.5 |

After the above ingredients were thoroughly compounded on a cold two-roll rubber mill the compound was calendered into a 20 mil film. The calendered film was coated on one side with a thin layer of the following composition and then allowed to dry:

| | Parts |
|---|---|
| "Hycar" OR–15 (copolymer of butadiene and acrylonitrile) | 13.0 |
| Heat reactive phenol-formaldehyde resin | 13.0 |
| Acetone | 74.0 |

The adhesive composition is prepared by masticating the "Hycar" OR–15 on a two-roll rubber mill followed by dissolving the masticated material in the acetone after which the heat reactive phenol-formaldehyde resin is dissolved in the solution of the "Hycar" OR–15.

A pellicle of linear polymeric ethylene terephthalate, weighing about .5 to 1.0 ounce per square yard, was superposed on the dried adhesive and rolled with a hand roller until smooth and all air bubbles between the thin film and the dried adhesive were eliminated. The calendered substrate with adherent film of the polyethylene terephthalate was placed between two metal plates and the entire assembly was subjected to heat (350° F.) and pressure (about 200 p. s. i.) for 20 minutes. The assembly was removed from the press and quickly cooled by quenching in cold water. The polyethylene terephthalate film adhered tenaciously to the "Hycar" film to form a smooth unitary structure. The degree of adhesion between the polyethylene terephthalate film and the "Hycar" OR–15 calendered film was measured and found to be 11.5 pounds per one inch strip, i. e., 11.5 pounds pull was required to separate the polyethylene terephthalate film from the "Hycar" film when pulled at a uniform rate of 2 inches per minute.

Example II

A linear polyethylene terephthalate film approximately 1 mil thick was coated on one side with a thin layer of the adhesive composition in Example I and the volatile solvent was allowed to evaporate. The dry adhesive coating was doubled upon itself to form two plies of film with adhesive sandwiched between. The doubled film was then hot pressed at 310° F. for 3 minutes at 300 p. s. i. After cooling to room temperature the adhesion of the two plies of film was found to be 17.0 pounds per one inch strip.

Example III

A film of linear polyethylene terephthalate approximately 1 mil thick was adhered to five mil aluminum foil by spreading the adhesive of Example I onto the film and foil and allowing it to dry. The dry coating on the film and foil was pressed together at 300° F. for 3 minutes at 300 p. s. i. After cooling, the adhesion of the film to the foil was found to be 13.0 pounds per one inch strip.

Example IV

A diaphragm material was produced by coating each side of a lightweight closely woven nylon parachute fabric having a twill weave, weighing 1.8 ounces per square yard and having a thread count of about 800×60 (number of threads per inch in the filler and warp directions respectively) with the following composition:

| | Per cent |
|---|---|
| "Hycar" OR–15 (copolymer of butadiene and acrylonitrile) | 20.6 |
| Heat reactive phenol-formaldehyde resin | 20.6 |
| Acetone | 58.8 |
| | 100.0 |

The above composition was applied to each side of the nylon base fabric by means of a doctor knife and dried by passing the coated fabric through a heat zone. The total dry coating weight, including both sides was about 1.0 ounce per square yard (approximately .5 ounce on each side). A preformed film of linear polyethylene terephthalate weighing about 1.0 ounce per square yard was placed on each side of the coated fabric and the assembly passed between heated calender rolls under pressure. The films and coated nylon fabric were welded together to form a unitary structure. The final product was flexible and resistant to aromatic and aliphatic hydrocarbon solvent which made it eminently useful as a hydrocarbon resistant diaphragm material.

Example V

A diaphragm material was made by calender coating each side of a woven cotton duck fabric weighing 12.7 ounces per square yard with 24.0 ounces per square yard of the following composition on each side of the fabric (a total of 48.0 ounces per square yard including both sides):

| | Parts |
|---|---|
| "Hycar" OR–25 (copolymer of butadiene and acrylonitrile) | 150.0 |
| Carbon black | 54.0 |
| Calcium carbonate ("Camelwite") | 72.0 |
| Stearic acid | 1.5 |
| Zinc oxide | 12.0 |
| Phenyl beta naphthylamine | 1.5 |
| Sebacic diester of monobutyl ether of ethylene glycol | 30.0 |
| Sulfur | 1.875 |
| Benzothiazyl disulfide | 1.875 |

The calender coated fabric was divided in two pieces, one of which was further coated with the phenol-formaldehyde/"Hycar" composition of Example I by means of a plurality of doctor knife applications followed by drying after each coat. Sufficient coats were applied to deposit a total of 6.0 ounces of dry coating per square yard. A film of linear polyethylene terephthalate weighing about 1.0 ounce per square yard was superposed over the dry phenol-formaldehyde/"Hycar" coating and the assembly was passed between heated pressure rolls to laminate the film to the coated fabric. The laminated fabric together with a portion of the calendered fabric without the linear polyethylene terephthalate film and phenol-formaldehyde/"Hycar" adhesive coating were next subjected to a temperature of 260° F. for a period of four hours, with a one-hour temperature rise up to 260° F. to cure the base coating and set the adhesive.

A comparison of the physical properties of the laminated construction with the portion not laminated to the linear polyethylene terephthalate film is given below:

| | Polyethylene Terephthalate Film Laminated to Calender Coated Fabric | Calender Coated Fabric (Without Laminated Film) |
|---|---|---|
| Tensile Strength (Grab), lbs | 213 x 217 | 156 x 149. |
| Tear Strength (Trapezoid), lbs | 45 x 45 | 27 x 25. |
| Adhesion of Film to Calendered Base Coating, lbs./1" Strip | 13.5 | |
| Ozone Resistance | >48 hrs | 5 min. |
| Vapor Permeability:[1] | | |
| Solvent Mixture— Diisobutylene, 60% Benzene, 5% Toluene, 20% Xylene, 15% | 0 | 6. |
| Diisobutylene | 0 | 4. |
| Benzene | 0 | 27. |
| Hi-Octane Gasoline | 0 | 3. |
| Water at 150° F | 2 | 6. |
| Liquid Permeability:[1] | | |
| Solvent Mixture— Diisobutylene, 60% Benzene, 5% Toluene, 20% Xylene, 15% | 2 | 15. |
| Diisobutylene | 2 | 8. |
| Benzene | 7 | 48. |
| Hi-Octane Gasoline | 2 | 9. |
| Chloroform | 36 | Sealing Gasket Dissolved Completely. |

[1] The vapor and liquid permeability tests were carried out by placing 150 g. of the test liquid in a pint Mason jar. The test specimen of diaphragm material was used as the sealing gasket for a two piece screw top lid with the linear polyethylene terephthalate surface toward the liquid. The test specimens were utilized as a diaphragm similar to the procedure described in ASTM-D814-46T. For the vapor permeability test the jars remained upright and for the liquid permeability test the jars were turned upside down so that the liquid contacted the test specimen. The numerical values reported above are the grams weight of the loss of liquid after 7 days at room temperature.

A comparison of the physical properties of the test specimens points out the improved properties realized by adhering a thin film of the linear polyethylene terephthalate to a synthetic rubber coated fabric. Both the tensile and tear strengths are higher with the film laminated material which is surprising since an improvement is seldom realized in one property without a sacrifice in the other. The value of the linear polyethylene terephthalate film as a barrier to both aromatic and aliphatic hydrocarbons is shown in the above table.

In order to establish the preferred range of the adhesive compositions, various ratios of heat reactive phenol-formaldehyde resin to the copolymer of butadiene and acrylonitrile in acetone were employed in adhering the linear polyethylene terephthalate film 1 mil thick to itself in same manner as outlined in Example II with the following results:

| Heat Reactive Phenol/Formaldehyde, Parts | 100 | 75 | 70 | 65 | 60 | 50 | 25 | ---- |
|---|---|---|---|---|---|---|---|---|
| Copolymer of Butadiene-Acrylonitrile, Parts | ---- | 25 | 30 | 35 | 40 | 50 | 75 | 100 |
| Adhesion, lbs./1" Strip | 1.0 | 1.0 | 1.0 | 10.0 | 11.5 | 13.5 | 6.5 | 4.0 |

The preferred range for the ratio of the phenol-aldehyde resin to the copolymer is 65 to 25 of the former to 35 to 75 of the latter.

In place of the linear polyethylene terepthalate used in the specific examples the highly polymerized esters obtained by the reaction of terephthalic acid and polymethylene glycols having more than 2 but not more than 10 methylene groups may also be used in this invention; such as, e. g. trimethylene glycol, tetramethylene glycol, pentamethylene glycol, hexamethylene glycol, heptamethylene glycol, octamethylene glycol, nonamethylene glycol, and decamethylene glycol. The glycols having 2 to 4 methylene groups are preferred.

The "Hycar" OR-15 in the preceding examples may be replaced wholly or in part by other types of butadiene-acrylonitrile copolymers such as "Buna N," "Perbunan," "Chemigum" and "Paracril." These copolymers of butadiene and acrylonitrile may be produced in accordance with the teaching set forth in U. S. Patent 1,973,000.

The phenol-aldehyde resin employed in this invention should be thermosetting or heat reactive, i. e., capable of hardening or curing when heated. The resin may be made by reacting any of the phenols with any of the aldehydes, preferably the aliphatic aldehydes. The phenol may be cresol, phenol, xylenol and resorcinol. The phenolic resins may be modified with drying oils, semi-drying oils, rosin and similar materials. Such resins are obtainable on the open market under the proprietary names of "Amberlite," "Bakelite," "Catalin," "Durez," "Indur," "Resinox" and "Texolite."

The adhesive composition may also be used as an adherent surface coating to the polymeric linear terephthalic esters in film or fabric form, in which case it may be desirable to add coloring materials, such as pigments and dyes, to the surface coating. Such a coating may be a continuous overall coating or it may be used as a printing or stencil ink, in which case the coating is applied in the form of designs on only a portion of the surface to be coated. Furthermore, the adhesive composition may be employed as a coating for anchoring various moistureproofing coatings, e. g., polyvinylidene chloride and copolymers thereof, on linear terephthalate esters in film form.

In some cases, it may be desirable to add a plasticizer to the adhesive composition, and for this purpose the following materials may be employed: sebacic or phthalic diester of monobutyl ether of ethylene glycol, tricresyl phosphate, triphenyl phosphate, dioctyl phthalate, dibutyl phthalate and dibutyl sebacate.

The products of this invention have unusual resistance to both aromatic and aliphatic hydrocarbon liquids which make them particularly useful as carburetor and fuel pump diaphragms, gasoline hose interiors, printer's blankets, covering for electrical cables and gaskets requiring hydrocarbon resistance.

It is apparent that many widely different embodiments of this invention can be made without departing from the spirit and scope thereof and, therefore, it is not intended to be limited except as indicated in the appended claims.

I claim:

1. The method which comprises coating the surface of a linear polymeric terephthalate ester with a composition which comprises a dispersion of a heat reactive phenol-aldehyde resin and a copolymer of butadiene and acrylonitrile in an organic solvent and removing the said organic solvent from the dispersion.

2. The method which comprises adhering a linear polymeric terephthalate ester surface to another surface which comprises applying to at least one of said surfaces a dispersion of a heat reactive phenol-aldehyde resin and a copolymer of butadiene and acrylonitrile in an organic solvent, removing the solvent from the dispersion, pressing the coated surface in contact with the other said surface, and heating the laminated assembly.

3. The process of claim 2 in which the other surface is a calendered film comprising a copolymer of butadiene and acrylonitrile as the principal film forming material.

4. The process of claim 2 in which the other surface is aluminum.

5. Process of claim 2 in which the other surface is nylon fabric.

6. Process of claim 2 in which the other surface is a cotton fabric.

7. Process of claim 2 in which the linear polymeric terephthalate ester is polyethylene terephthalate.

8. Process of claim 2 in which the linear polymeric terephthalate ester is in the form of a pellicle.

9. Process of claim 2 in which the linear polymeric terephthalate ester is in the form of a fabric.

10. A linear polymeric terephthalate ester sheet material with an adherent film of a blend of a heat reactive phenol-aldehyde resin and a copolymer of butadiene and acrylonitrile.

11. A laminated assembly comprising at least two laminae, one of which is a linear polymeric terephthalate ester, said laminae being firmly bonded by means of a composition containing a heat reactive phenol-aldehyde resin and a copolymer of butadiene and acrylonitrile, the phenol-aldehyde resin being present in amount between 65% and 25% based on the combined weight of the phenol-aldehyde resin and the copolymer of butadiene and acrylonitrile.

12. The product of claim 11 in which the other laminae is a calendered film comprising a copolymer of butadiene and acrylonitrile.

13. The product of claim 11 in which the other laminae is aluminum.

14. The product of claim 11 in which the other laminae is nylon fabric.

15. The product of claim 11 in which the other laminae is cotton fabric.

16. The product of claim 11 in which the linear polymeric terephthalate ester is polyethylene terephthalate.

17. The product of claim 11 in which the linear polymeric terephthalate ester is in the form of a pellicle.

18. The product of claim 11 in which the linear polymeric terephthalate ester is in the form of a fabric.

ARTHUR BERNARD NESS.

References Cited in the file of this patent

UNITED STATES PATENTS

| Number | Name | Date |
|---|---|---|
| 2,376,854 | Saunders et al. | May 22, 1945 |
| 2,479,342 | Gibbons et al. | Aug. 16, 1949 |
| 2,575,265 | Fiedler et al. | Nov. 13, 1951 |
| 2,585,596 | Stanton | Feb 12, 1952 |

OTHER REFERENCES

Cycleweld Cement—General Data Chart, Oct. 31, 1950.